(12) United States Patent
Noda et al.

(10) Patent No.: US 9,496,749 B2
(45) Date of Patent: Nov. 15, 2016

(54) STORAGE BATTERY CONTROL DEVICE AND ELECTRICAL STORAGE DEVICE

(75) Inventors: Mitsuo Noda, Hitachinaka (JP); Akihiko Kudo, Hitachinaka (JP); Tatsumi Yamauchi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 273 days.

(21) Appl. No.: 14/379,889

(22) PCT Filed: Mar. 23, 2012

(86) PCT No.: PCT/JP2012/057532
§ 371 (c)(1),
(2), (4) Date: Aug. 20, 2014

(87) PCT Pub. No.: WO2013/140605
PCT Pub. Date: Sep. 26, 2013

(65) Prior Publication Data
US 2015/0037656 A1 Feb. 5, 2015

(51) Int. Cl.
*H02J 7/00* (2006.01)
*H02J 7/14* (2006.01)
(Continued)

(52) U.S. Cl.
CPC .......... *H02J 7/1461* (2013.01); *B60L 11/1851* (2013.01); *H01M 10/425* (2013.01);
(Continued)

(58) Field of Classification Search
CPC ............. B60L 11/1851; B60L 2200/26; H01M 10/4207; H01M 10/425; H01M 10/4264; H01M 10/441; H01M 16/00; H01M 2010/4271; H01M 2220/20; H02J 2007/0037; H02J 2007/0039; H02J 2007/0095; H02J 7/0016; H02J 7/0026; H02J 7/1423; H02J 7/1461;
(Continued)

(56) References Cited

U.S. PATENT DOCUMENTS 5,216,586 A 6/1993 Saito
5,880,575 A * 3/1999 Itou ..................... H01M 10/441
320/122

(Continued)

FOREIGN PATENT DOCUMENTS

JP 05-015051 A 1/1993
JP 2003-174728 A 6/2003
(Continued)

*Primary Examiner* — Nathaniel Pelton
(74) *Attorney, Agent, or Firm* — Volpe and Koenig, P.C.

(57) ABSTRACT

A storage battery control device controls an assembly battery having a plurality of secondary battery cells connected to each other, including at least one integrated circuit adapted to monitor and control charging and discharging of each of the secondary battery cells of the assembly battery. A bypass capacitor is disposed in a channel connecting a positive electrode-side external terminal and a negative electrode-side external terminal of the integrated circuit to each other. At least one first current limiting element is disposed in the channel, and at least one first switch is disposed in parallel to the first current limiting element, and adapted to short the first current limiting element.

9 Claims, 9 Drawing Sheets

(51) Int. Cl.
    *H01M 10/44* (2006.01)
    *B60L 11/18* (2006.01)
    *H01M 16/00* (2006.01)
    *H01M 10/42* (2006.01)
(52) U.S. Cl.
    CPC ..... *H01M 10/4207* (2013.01); *H01M 10/4264* (2013.01); *H01M 10/441* (2013.01); *H01M 16/00* (2013.01); *H02J 7/0016* (2013.01); *H02J 7/0026* (2013.01); *H02J 7/1423* (2013.01); *B60L 2200/26* (2013.01); *H01M 2010/4271* (2013.01); *H01M 2220/20* (2013.01); *H02J 2007/0037* (2013.01); *H02J 2007/0039* (2013.01); *H02J 2007/0095* (2013.01); *Y02T 10/7011* (2013.01); *Y02T 10/7022* (2013.01); *Y02T 10/7055* (2013.01)
(58) Field of Classification Search
    CPC ............. Y02T 10/7011; Y02T 10/7022; Y02T 10/7055

USPC .......................................... 320/134; 429/149
See application file for complete search history.

(56)           References Cited

U.S. PATENT DOCUMENTS

| | | |
|---|---|---|
| 2003/0058668 A1 | 3/2003 | Uchida |
| 2009/0066291 A1* | 3/2009 | Tien ...................... H02J 7/0016 320/118 |
| 2013/0043840 A1* | 2/2013 | Bylsma ............... B60L 11/1866 320/118 |

FOREIGN PATENT DOCUMENTS

| | | |
|---|---|---|
| JP | 2007-280872 A | 10/2007 |
| JP | 2011-253777 A | 12/2011 |

* cited by examiner

STORAGE BATTERY CONTROL DEVICE AND ELECTRICAL STORAGE DEVICE

TECHNICAL FIELD

The present invention relates to a storage battery control device and an electrical storage device.

BACKGROUND ART

In an electric vehicle and a hybrid vehicle, there is used a battery module having a plurality of cell groups connected in series or in series-parallel, wherein the cell group has a plurality of secondary battery cells (electric cells) such as lithium electric cells connected in series or in series-parallel. Further, a device having a plurality of battery modules connected in series or in series-parallel is used together with a battery control circuit for controlling these battery modules as an electrical storage device.

In the case of connecting (live-line connection) the secondary battery cells connected in series and a control device for detecting the voltage of these batteries to each other, there is required a device for preventing a high voltage from being applied to an integrated circuit incorporated therein, namely a high current from flowing into the control device. In PTL 1, for example, there is used a special connector in which the lengths of the connector pins are changed so that the voltage detection lines are connected in ascending order of the battery voltage in a battery pack (assembly battery) having a plurality of secondary batteries connected in series-parallel when connecting the battery pack to the control device.

In PTL 2, there is disclosed a connector configured so that a high voltage is not applied to a cell controller IC (an integrated circuit) when performing the live-line connection for connecting the assembly battery and the cell controller IC to each other. The cell controller IC disclosed in PTL 2 is disposed for each of the cell groups each having a plurality of secondary battery cells connected in series to each other. The connector is configured so as to connect the GND line of the high potential side of the two cell controller ICs adjacent to each other and the VCC line of the low potential side thereof among a plurality of wiring lines for connecting the assembly battery and the cell controller ICs to the battery pack-side first and at the same time.

CITATION LIST

Patent Literature

PTL 1: JP-A-2007-280872
PTL 2: JP-A-2011-253777

SUMMARY OF INVENTION

Technical Problem

Such a connector as disclosed in PTL 1 is a special connector, and becomes a factor for a rise in cost. Further, since the number of secondary batteries constituting the cell group is on the increase, the number of connector pins is also on the increase. In such multiple-pin connectors, the connector for connecting the pins in good order becomes expensive. The connector configuration disclosed in PTL 2 increases the number of connectors, and therefore, becomes a factor for a rise in cost and complication of a manufacturing operation.

Further, since the number of secondary batteries included in one cell group has increased, the terminal voltage becomes a high voltage only with one cell group, and there arises a problem that an excessive charging current flows into the cell controller IC at the live-line connection. Therefore, the rise in cost cannot be avoided with the countermeasure only by the connector, and a countermeasure other than the connector has been required.

Solution to Problem (1) According to a first aspect of the invention, there is provided a storage battery control device adapted to control a assembly battery having a plurality of secondary battery cells connected to each other, including at least one integrated circuit adapted to monitor and control charging and discharging of each of the secondary battery cells of the battery pack, a bypass capacitor disposed in a channel connecting a positive electrode-side external terminal and a negative electrode-side external terminal of the integrated circuit to each other, at least one first current limiting element disposed in the channel, and at least one first switch disposed in parallel to the first current limiting element, and adapted to short the first current limiting element.

(2) According to a second aspect of the invention, in the storage battery control device according to the first aspect of the invention, it is preferable that the integrated circuit includes a plurality of integrated circuits each adapted to control a predetermined number of the secondary battery cells of the battery pack, the first current limiting element includes a plurality of the first current limiting elements disposed in all of the channels of the plurality of integrated circuits, or in a channel through which a rush current higher than a allowable current flows when connecting the battery pack and the battery control device to each other among the channels of the plurality of integrated circuits, and the first switch includes a plurality of the first switches disposed so as to correspond to the plurality of integrated circuits.

(3) According to a third aspect of the invention, in the storage battery control device according to one of the first and second aspects of the invention, it is preferable that the first switch is closed with a delay to short the first current limiting element after the integrated circuit is started up.

(4) According to a fourth aspect of the invention, in the storage battery control device according to any one of the first through third aspects of the invention, it is preferable that the first switch is closed by an internal power supply of the integrated circuit to short the first current limiting element after the integrated circuit is started up.

(5) According to a fifth aspect of the invention, in the storage battery control device according to the second aspect of the invention, it is preferable to further include a communication channel adapted to communicate a variety of signals between two of the integrated circuits disposed consecutively, a second current limiting element adapted to limit the current flowing through the communication channel, and a second switch disposed in parallel to the second current limiting element, and adapted to short the second current limiting element.

(6) According to a sixth aspect of the invention, in the storage battery control device according to the fifth aspect of the invention, it is preferable that there is further included an isolation element used to control the second switch, and the second switch is closed via the isolation element used to control the second switch in response to a signal from a host controller of the integrated circuit to short the second current limiting element.

(7) According to a seventh aspect of the invention, in the storage battery control device according to any one of the first, second, and fifth aspects of the invention, it is preferable that there is further included a shorting switch driving power supply disposed separately from the integrated circuit, and the first switch is closed by an output of the shorting switch driving power supply to short the first current limiting element after the integrated circuit is started up.

(8) According to an eighth aspect of the invention, in the storage battery control device according to the fifth aspect of the invention, it is preferable that there is further included a shorting switch driving power supply disposed separately from the integrated circuit, and the second switch is closed by an output of the shorting switch driving power supply to short the second current limiting element after the integrated circuit is started up.

(9) According to a ninth aspect of the invention, in the storage battery control device according to the second aspect of the invention, it is preferable that the first current limiting element and the first switch are disposed with respect to a channel connecting a positive electrode-side external terminal and a negative electrode-side external terminal of at least the integrated circuit with the highest potential and adapted to control a predetermined number of the secondary battery cells among the plurality of integrated circuits.

(10) According to a tenth aspect of the invention, there is provided an electrical storage device including the storage battery control device according to any one of the first through ninth aspects of the invention, and the assembly battery.

Advantageous Effects of Invention

According to the invention, it is possible to reliably prevent the high voltage of the assembly battery from being applied to the integrated circuit of the storage battery control device when connecting the assembly battery and the storage battery control device to each other.

DESCRIPTION OF EMBODIMENTS

Figure 1:
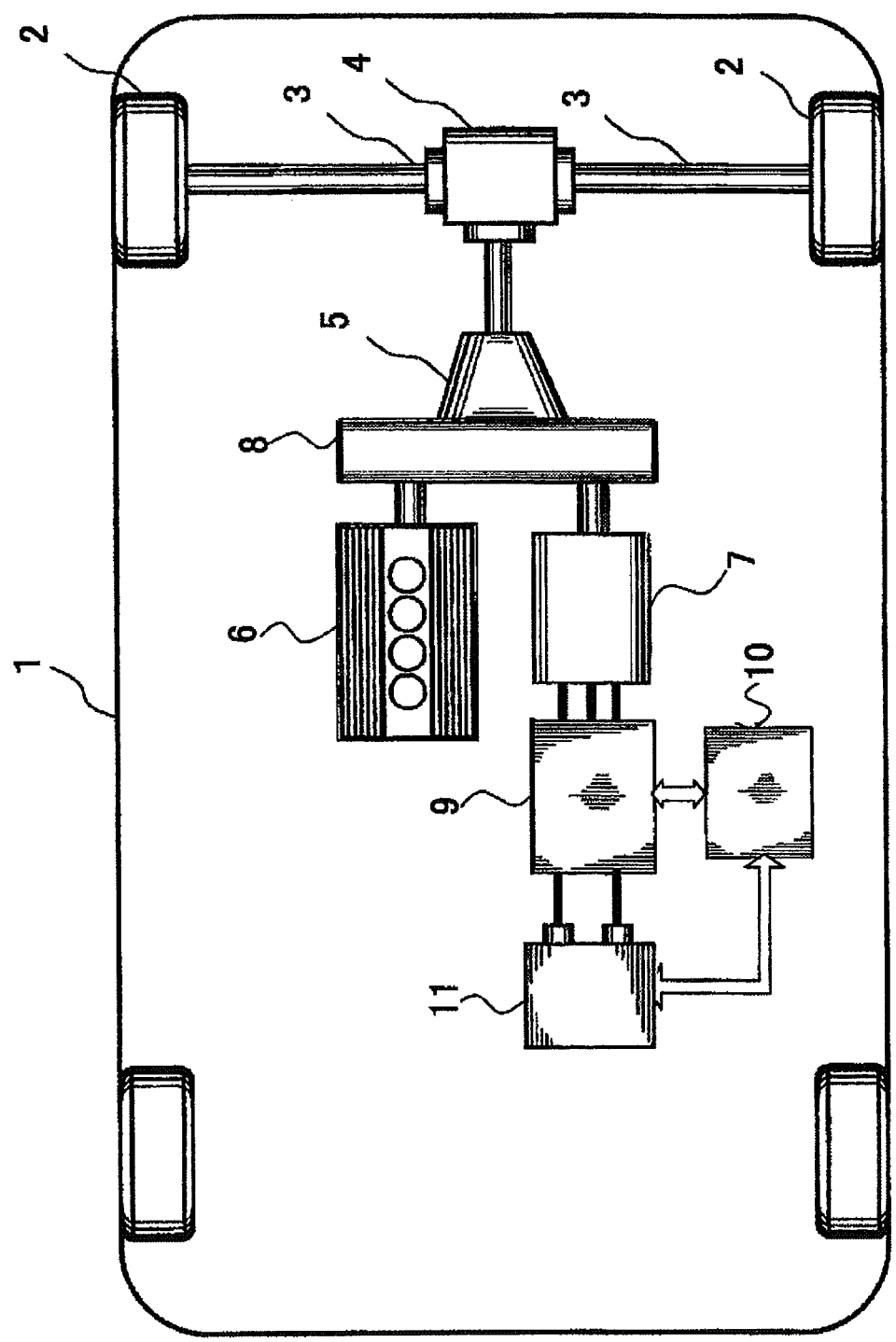
FIG. 1 is a block diagram showing a configuration of a drive system for a hybrid vehicle.

Hereinafter, some embodiments of the invention will be explained with reference to the drawings. In the embodiments explained hereinafter, there is explained the case in which the storage battery control device according to the invention, and the electrical storage device provided with the storage battery control device and the assembly battery are applied to a drive system for a hybrid vehicle. It should be noted that in the following description, the cell group, the battery module block, and the battery module are each constituted by a plurality of secondary battery cells, and are collectively referred to as an assembly battery. Further, the configurations of the embodiments explained below can also be applied to a railroad vehicle such as a hybrid train, and so on. Further, the storage battery control device and the electrical storage device according to the invention can also be applied to an electric vehicle.

<Schematic Configuration of Drive System for Hybrid Vehicle>

Firstly, the drive system for a hybrid vehicle will be explained using FIG. 1. In the drive system of the hybrid vehicle 1 shown in FIG. 1, axles 3 mechanically connected to drive wheels 2 are connected to a differential gear 4, and an input shaft of the differential gear 4 is connected to a transmission 5. The drive force of an engine 6 as an internal-combustion engine and an electric motor-generator 7 is input to the transmission 5 via a drive force switching device 8.

In FIG. 1, there is adopted a so-called parallel hybrid system having the engine 6 and the electric motor-generator 7 disposed in parallel to each other as the drive source of the drive wheels 2. Further, as the drive system for a hybrid vehicle, there is cited a so-called serial hybrid system in which the energy of the electric motor-generator 7 is used as the drive source of the drive wheels 2, and the energy of the engine 6 is used as the drive source of the electric motor-generator 7, namely used for charging the battery, and in the invention, there can be adopted these systems, and a system obtained by combining these systems.

An electrical storage device 11 as a power supply device is electrically connected to the electric motor-generator 7 via a power conversion device 9. The power conversion device 9 is controlled by a control device 10.

When making the electric motor-generator 7 act as an electric motor, the power conversion device 9 functions as a DC to AC converter circuit for converting the DC power output from the electrical storage device 11 into three-phase AC power. Further, when making the electric motor-generator 7 act as an electric generator in regenerative braking, the power conversion device 9 functions as an AC to DC converter circuit for converting the three-phase AC power output from the electric motor-generator 7 into DC power. To the DC side of the power conversion device 9, positive and negative terminals of module batteries of the electrical storage device 11 are electrically connected. On the AC side of the power conversion device 9, there are disposed three series circuits each formed of two switching semiconductor elements, and it is arranged that winding wires of the three phases of the armature coils of the electric motor-generator 7 are electrically connected to the intermediates between the two switching semiconductor elements of the series circuits, respectively.

The electric motor-generator 7 is a permanent-magnet field three-phase AC synchronous rotary electric machine, which functions as a motor for driving the drive wheels 2, and is provided with armatures (stators) and a field system (a rotator) disposed so as to be opposed to the armatures and held rotatably, and uses magnetic flux of the permanent magnet for the field system. The electric motor-generator 7 generates the rotative power necessary for the drive of the drive wheels 2 based on the magnetic action between a rotating magnetic field generated by the three-phase AC power supplied to the armature coils and rotating at a synchronous speed, and the magnetic flux of the permanent magnet.

When driving the electric motor-generator 7 as the electric motor, the armatures are supplied with the three-phase AC power controlled by the power conversion device 9, and then generate the rotating magnetic field. On the other hand, the armatures function as regions for generating the three-phase AC power due to interlinkage of the magnetic flux when driving the electric motor-generator 7 as the electric motor, and are provided with armature cores (stator cores) as magnetic substances, and three-phase armature coils (stator coils) mounted to the armature cores, respectively. The field system is a region for generating field magnetic flux when driving the electric motor-generator 7 as the electric motor or the electric generator, and is provided with a field core (a rotator core) as a magnetic substance, and a permanent magnet mounted to the field core.

As the electric motor-generator 7, it is also possible to adopt a wound-field three-phase AC synchronous rotary electric machine for generating the rotative power based on the magnetic action between the rotating magnetic field generated by the three-phase AC power supplied to the armature coils, and rotating at the synchronous speed, and flux caused by excitation of a coil, a three-phase AC induction rotary electric machine, or the like. In the case of the wound-field three-phase AC synchronous rotary electric machine, the configuration of the armatures is basically the same as that of the permanent-magnet field three-phase AC synchronous rotary electric machine. Meanwhile, the field system is different in configuration, and has a configuration in which a field coil (a rotator coil) is wound around the field core as the magnetic substance. It should be noted that in the wound-field three-phase AC synchronous rotary electric machine, a permanent magnet is mounted to the field core wound with the field coil to thereby suppress leakage of the flux due to the coil, in some cases. The field coil is supplied with a field current from an external power supply to be exited to thereby generate the flux.

To the electric motor-generator 7, there are mechanically connected the axles 3 of the drive wheels 2 via the drive force switching device 8, the transmission 5, and the differential gear 4. The transmission 5 transmits the rotative power, which has been output from the electric motor-generator 7, to the differential gear while changing gear. The differential gear 4 transmits the rotative power, which has been output from the transmission 5, to the right and left axles 3. The drive force switching device 8 is switched by a host control device (not shown) such as engine control or running control, and switches between the operation as the electric motor and the operation as the electric generator in accordance with accelerated running in the engine control, engine start after engine stop when idling using the electric motor-generator 7, regenerative braking cooperation in brake control, and so on.

The electrical storage device 11 is a driving in-vehicle power supply for storing the electric power generated by the electric motor-generator 7 at regeneration as the own driving power, and discharging the electric power necessary to drive the electric motor-generator 7 as the electric generator when driving the electric motor-generator 7. For example, it is a battery system constituted by several tens of lithium ion batteries so as to have a rated voltage equal to or higher than 100 V. It should be noted that the detailed configuration of the electrical storage device 11 will be described later.

Besides the electric motor-generator 7, electric actuators for supplying power to in-vehicle accessories (e.g., a power steering system, an air brake), a low-voltage battery as an electrical component power supply lower in rated voltage than the electrical storage device 11 and for supplying drive power to in-vehicle electrical components (e.g., lights, an audio system, and an in-vehicle electronic control unit), and so on are electrically connected to the electrical storage device 11 via a DC/DC converter. The DC/DC converter is a step-up/step-down device for stepping down the output voltage of the electrical storage device 11 to supply the output voltage to the electric actuators and the low-voltage battery, and stepping up the output voltage of the low-voltage battery to supply the output voltage to the electrical storage device 11 and so on. A lead battery with a rated voltage of 12 V is used for the low-voltage battery. As the low-voltage battery, it is also possible to use a lithium ion battery or a nickel hydrogen battery having the same rated voltage.

At power running (e.g., start, acceleration, and normal running) of the hybrid vehicle 1, when a positive torque command is provided to the control device 10 to control an operation of the power conversion device 9, the DC power stored in the electrical storage device 11 is converted by the power conversion device 9 into the three-phase AC power, and is then supplied to the electric motor-generator 7. Thus, the electric motor-generator 7 is driven to generate the rotative power. The rotative power thus generated is transmitted to the axles 3 via the drive force switching device 8, the transmission 5, and the differential gear 4, and then drives the drive wheels 2.

At the regeneration (e.g., deceleration, and braking) of the hybrid vehicle 1, when a negative torque command is provided to the control device 10 to control an operation of the power conversion device 9, the three-phase AC power generated from the electric motor-generator 7 which is driven by the rotative power of the drive wheels 2 is converted into the DC power, and is then supplied to the electrical storage device 11. Thus, the DC power thus converted into is stored in the electrical storage device 11.

The control device 10 calculates a current command value from the torque command value output from the host control device (not shown), and at the same time, calculates a voltage command value based on a difference between the current command value and the actual current flowing through the power conversion device 9, generates a PWM (pulse width modulation) signal based on the voltage command value thus calculated, and then outputs the PWM signal to the power conversion device 9.

<Overall Configuration of Electrical Storage Device 11>

Then, a drive device of the electric motor applicable to an electric vehicle and a hybrid vehicle provided with the electrical storage device 11 including the battery control device according to the invention will be explained with reference to FIG. 2.

Figure 2:
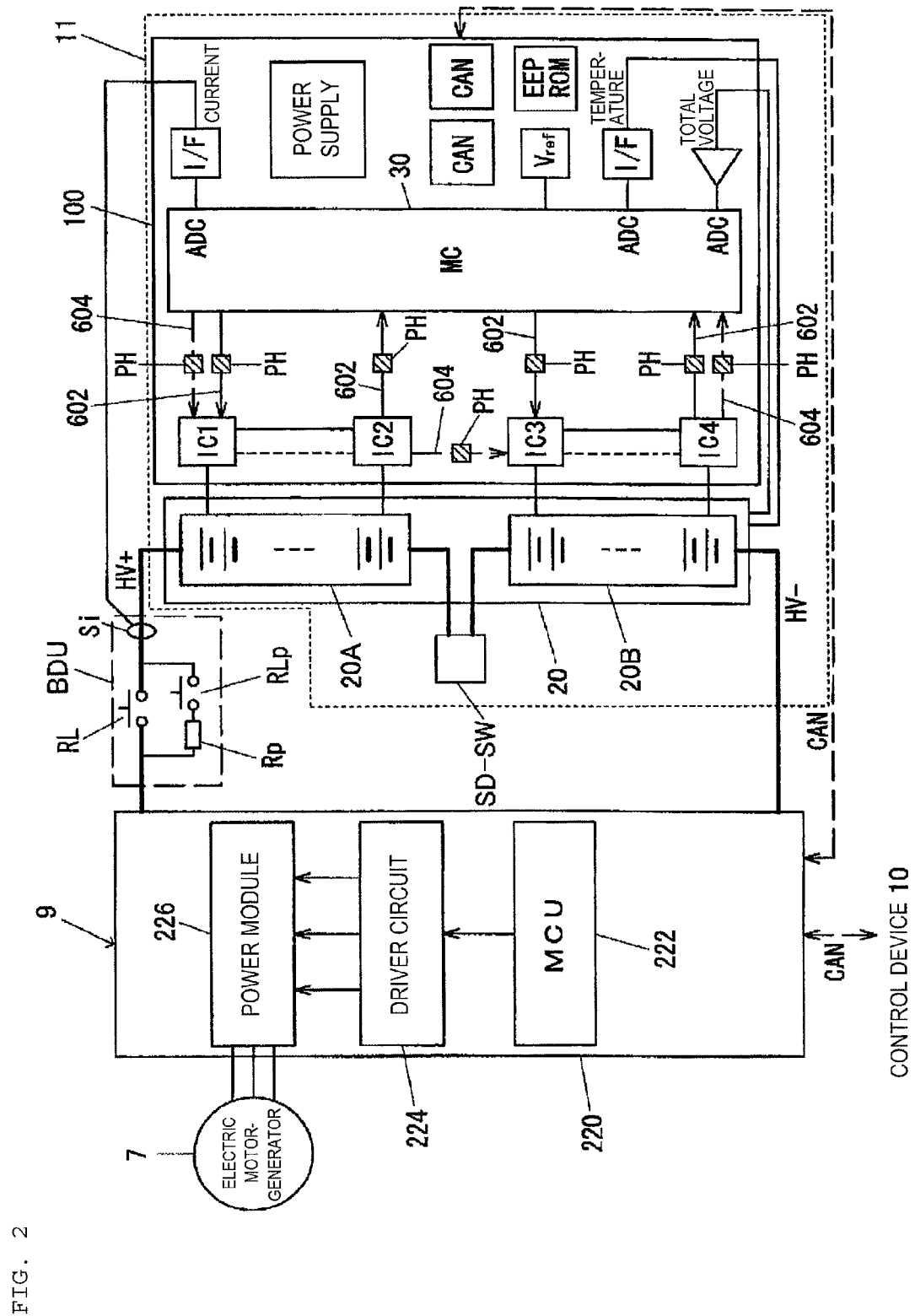
FIG. 2 is a block diagram showing a drive system of a rotary electric machine for a vehicle.

FIG. 2 is a block diagram showing a drive system of a rotary electric machine for a vehicle. The drive system shown in FIG. 2 is provided with a battery module 20, a storage battery control device 100 for monitoring the battery module 20, an inverter device 220 for converting the DC power from the battery module 20 into the three-phase AC power, and the electric motor-generator 7 for driving a vehicle. The electric motor-generator 7 is driven by the three-phase AC power from the inverter device 220. The inverter device 220 and the storage battery control device 100 are connected to each other with CAN communication, and the inverter device 220 functions as a host controller with respect to the storage battery control device 100. Further, the inverter device 220 acts based on the command information from the control device 10 (see FIG. 1) superior to the inverter device 220.

The inverter device 220 includes a power module 226, an MCU 222 for controlling the inverter device, and a driver circuit 224 for driving the power module 226. The power module 226 converts the DC power supplied from the battery module 20 into the three-phase AC power for driving the electric motor-generator 7 as the electric motor. It should be noted that although not shown in the drawings, a smoothing capacitor with a high capacitance of about 700 µF through 2000 µF is disposed between strong electric lines HV+, HV− to be connected to the power module 226. The smoothing capacitor has a function of reducing a voltage noise applied to an integrated circuit provided to the storage battery control device 100.

In an operation starting state of the inverter device 220, the charge of the smoothing capacitor is roughly zero, and when a relay RL is closed, a high initial current flows into the smoothing capacitor. Further, due to the high current, there is a possibility that the relay RL is broken by fusion. In order to solve this problem, the MCU 222 further changes a pre-charge relay RLP from an open state to a closed state to thereby charge the smoothing capacitor at the beginning of the drive of the electric motor-generator 7 following a command from the control device 10, and then changes the relay RL from the open state to the closed state to start the supply of the electric power from the battery module 20 to the inverter device 220. When charging the smoothing capacitor, charging is performed via a resistor RP while limiting the maximum current. By performing such an operation, it is possible to reduce the maximum current flowing through the battery cells and the inverter device 220 to a value equal to or lower than a predetermined value as well as protecting the relay circuit, and thus a high level of safety can be maintained.

It should be noted that the inverter device 220 controls the phase of the AC power generated by the power module 226 with respect to the rotator of the electric motor-generator 7 to make the electric motor-generator 7 operate as the electric generator when braking the vehicle. In other words, the regenerative braking control is performed, and the electric power generated due to the regenerative power generation is regenerated in the battery module 20 to thereby charge the battery module 20. In the case in which the charging state of the battery module 20 is lowered to a level lower than a reference state, the inverter device 220 operates the electric motor-generator 7 as the electric generator. The three-phase AC power generated in the electric motor-generator 7 is converted into the DC power by the power module 226, and is then supplied to the battery module 20. As a result, the battery module 20 is charged.

On the other hand, in the case of performing the power running operation of the electric motor-generator 7 as the electric motor, the MCU 222 controls the driver circuit 224 following a command of the control device 10 so as to generate the rotating magnetic field in a leading direction with respect to the rotation of the rotator of the electric motor-generator 7, and controls the switching operation of the power module 226. In this case, the DC power is supplied from the battery module 20 to the power module 226. Further, in the case of charging the battery module 20 with the regenerative braking control, the MCU 222 controls the driver circuit 224 so as to generate the rotating magnetic field in a lagging direction with respect to the rotation of the rotator of the electric motor-generator 7, and controls the switching operation of the power module 226. In this case, the electric power from the electric motor-generator 7 is supplied to the power module 226, and then the DC power of the power module 226 is supplied to the battery module 20. As a result, it results that the electric motor-generator 7 functions as the electric generator.

The power module 226 of the inverter device 220 performs conduction and breaking operations at high speed to thereby achieve the power conversion between the DC power and the AC power. On this occasion, since the high current is broken at high speed, a large voltage variation occurs due to the inductance provided to a DC circuit. In order to suppress the voltage variation, the smoothing capacitor high in capacitance described above is provided.

The battery module 20 is constituted here by, for example, two battery module blocks 20A, 20B connected in series to each other. Each of the battery module blocks 20A, 20B is provided with what has a plurality of cell groups connected in series to each other, each of the cell groups having a plurality of battery cells connected in series to each other. The battery module block 20A and the battery module block 20B are connected in series to each other via a service disconnect SD-SW for maintenance and inspection having a switch and a fuse connected in series to each other. The service disconnect SD-SW opens to thereby break the series current in the electric circuit, and thus, no current flows even if one connection circuit is created between somewhere in the battery module blocks 20A, 20B and the vehicle body. Due to such a configuration, a high level of safety can be maintained. Further, even if the operator touches between HV+ and HV− at an inspection operation, no high voltage is applied to the human body, and therefore, safety is achieved.

To the strong electric line HV+ between the battery module 20 and the inverter device 220, there is provided a battery disconnect unit BDU including a relay RL, a resistor RP, and a pre-charge relay RLP. A series circuit of the resistor RP and the pre-charge relay RLP is connected in parallel to the relay RL.

The storage battery control device 100 mainly performs measurement of voltages of the respective cells, measurement of the total voltage, measurement of a current, and adjustments of cell temperature and the capacitances of the cells. For this purpose, a plurality of storage battery control ICs (integrated circuits) is disposed as the cell controller ICs. The plurality of battery cells disposed in each of the battery module blocks 20A, 20B is divided into a plurality of cell groups, and the cell controller IC is provided to each of the cell groups, and controls the battery cells included in the cell group. It should be noted that the cell group, the battery module block, and the battery module are each constituted by a plurality of secondary battery cells, and are collectively referred to as an assembly battery.

Figure 4:
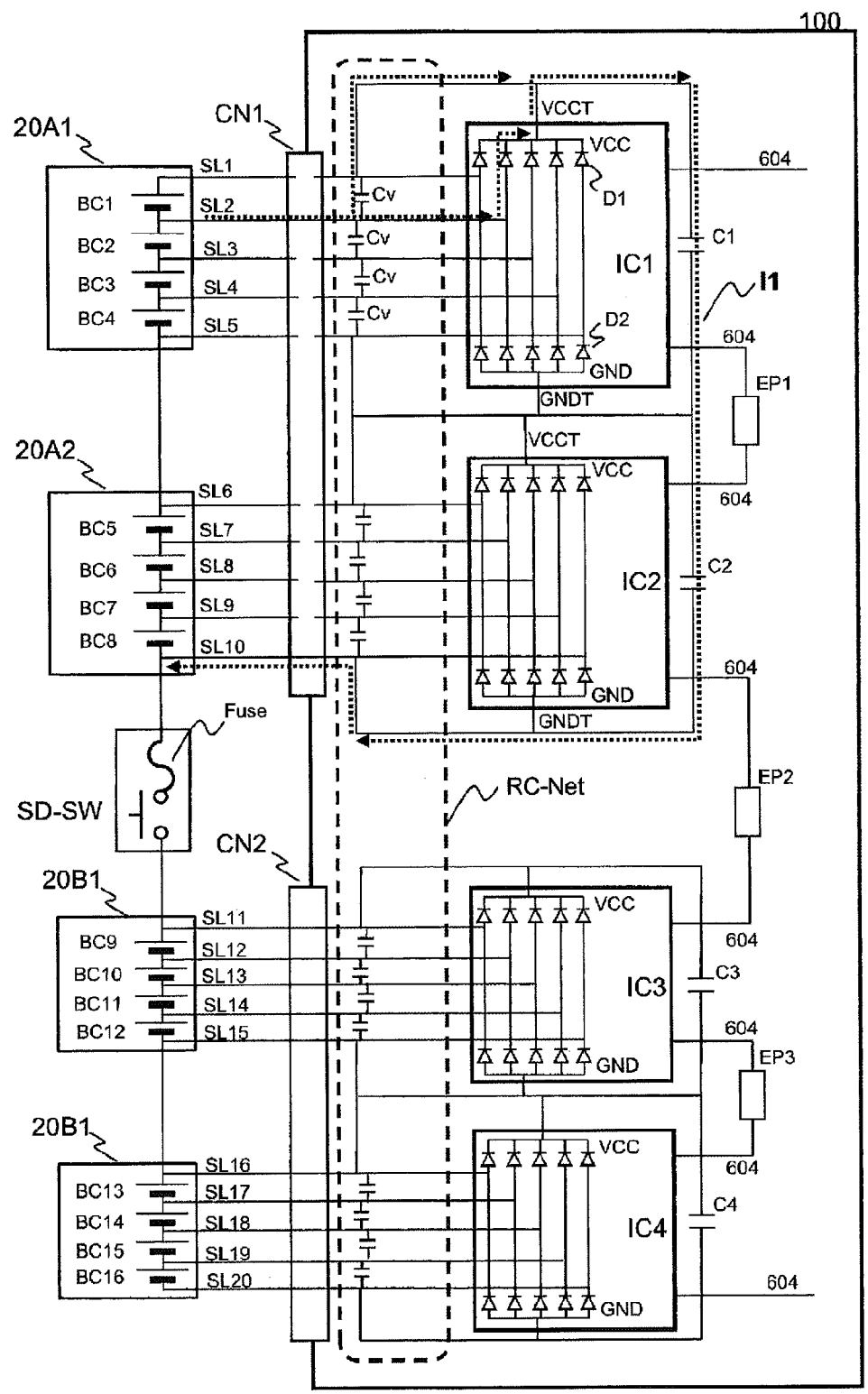
FIG. 4 is a diagram for explaining a problem in the live-line connection in a conventional connection structure of an assembly battery and a storage battery control IC.

For the sake of simplicity, it is assumed in the following explanation that each of the cell groups is constituted by four battery cells. It is assumed that the battery module blocks 20A, 20B are constituted by pairs of cell groups 20A1, 20A2, and 20B1, 20B2, respectively, as shown in FIG. 4. Therefore, four cell controllers IC1-IC4 are provided.

However, the number of the battery cells included in each of the cell groups is not limited to four, but can also be five or more, and further, it is also possible to include, for example, the cell group with four battery cells and the cell group with six battery cells in combination. As the cell controller IC disposed so as to correspond to each of the cell groups, there can be used what is designed to be available in both of the case in which the number of the battery cells included in each of these cell groups is four, and the case in which the number is five or more.

Further, in order to obtain the voltage and the current necessary for the electric vehicle and the hybrid vehicle, it is also possible that each of the battery module blocks has a plurality of cell groups connected in series or in series-parallel to each other as described above, or two or more of battery module blocks can further be connected in series or in series-parallel to each other.

In FIG. 2, the cell controllers IC1-IC4 for controlling the respective cell groups are each provided with a communication system 602 and a one-bit communication system 604. In the communication system 602 for reading the cell voltage and transmitting a variety of commands, serial communication with a microcomputer 30 for controlling the battery module 20 is performed in a daisy chain mode via an isolation element (e.g., a photocoupler) PH. The one-bit communication system 604 transmits an abnormal signal when cell overcharge is detected. In the example shown in FIG. 2, the communication system 602 is separated into an upper communication channel with respect to the cell controllers IC1, IC2 for the battery module block 20A and a lower communication channel with respect to the cell controllers IC3, IC4 for the battery module block 20B.

Figure 3:
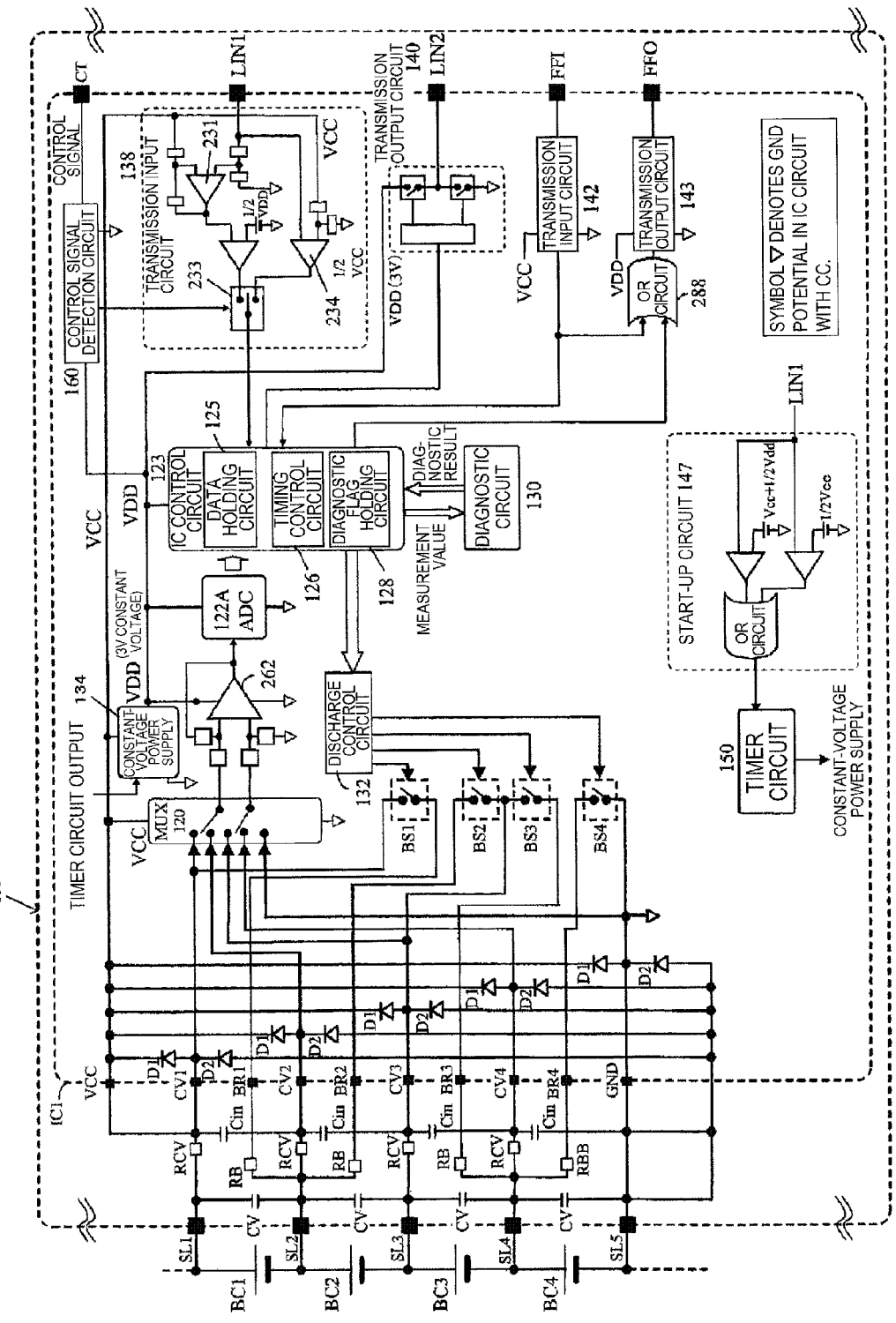
FIG. 3 is a diagram showing an outline of an internal circuit of a storage battery control IC (a cell controller IC).

Each of the cell controller ICs performs an abnormality diagnosis, and in the case in which it is determined that the cell controller IC itself is abnormal, or in the case of receiving the abnormal signal from the upper cell controller IC by a reception terminal FFI (see FIG. 3), the cell controller IC transmits the abnormal signal from a transmission terminal FFO (see FIG. 3). In contrast, in the case in which the abnormal signal having already been received by the reception terminal FFI vanishes, or the determination that itself is abnormal turns to the determination that it is normal, the abnormal signal to be output from the transmission terminal FFO vanishes. In the present embodiment, the abnormal signal is a one-bit signal.

The microcomputer 30 does not transmit the abnormal signal to the cell controller IC, but transmits the test signal as a pseudo abnormal signal to the one-bit communication system 604 in order to perform a diagnostic on that the one-bit communication system 604 as a transmission channel of the abnormal signal functions correctly. The cell controller IC1 having received the test signal transmits the abnormal signal to the communication system 604, and then the abnormal signal is received by the cell controller IC2. The abnormal signal is then transmitted from the cell controller IC2 to the cell controllers IC3, IC4 in sequence, and is finally returned from the cell controller IC4 to the microcomputer 30. If the communication system 604 functions normally, the pseudo abnormal signal transmitted from the microcomputer 30 returns to the microcomputer 30 via the communication system 604. The microcomputer 30 can perform the diagnostic of the communication system 604 by transmitting and then receiving the pseudo abnormal signal in such a manner as described above, and the reliability of the system is improved.

In the battery disconnect unit BDU, there is disposed a current sensor Si such as a Hall element, and the output of the current sensor Si is input to the microcomputer 30. Signals related to the total voltage and the temperature of the battery module 20 are also input to the microcomputer 30, and are then each measured by an AD converter (ADC) of the microcomputer 30. The temperature sensors are disposed at a plurality of places in the battery module blocks 20A, 20B.

<Configuration of Cell Controller IC>

Then, an outline of a circuit of the cell controller IC used for the storage battery control device according to the invention will be explained with reference to FIGS. 3 and 2.

FIG. 3 is a diagram showing an outline of an internal blocks of the cell controller IC as the storage battery control IC, and shows the cell controller IC1 to which the four battery cells BC1-BC4 of the cell group 20A1 are connected as an example. It should be noted that although the explanation is omitted, substantially the same configurations are adopted with respect to other ICs. Further, as described above, the number of the battery cells included in each of the cell groups is not limited to four, but can also be six or more. The cell controller IC is designed so as to be able to cope with the number of battery cells included in the cell group. Regarding, for example, balancing switches, although there have already been provided six balancing switches so as to be able to cope with six battery cells, only four out of six balancing switches are used in the case in which the number of the battery cells included in the cell group is four.

In the cell controller IC1, there are disposed a multiplexer 120 and an analog to digital converter 122A as a battery state detection circuit, an IC control circuit 123, a diagnostic circuit 130, transmission input circuits 138, 142, transmission output circuits 140, 143, a start-up circuit 147, a timer circuit 150, a control signal detection circuit 160, a differential amplifier 262, and an OR circuit 288.

Terminal voltages of the battery cells BC1-BC4 are input to the multiplexer 120 via voltage detection lines SL1-SL5, voltage input terminals CV1-CV4, and a GND terminal. The multiplexer 120 selects either one of the voltage input terminals CV1-CV4, and the GND terminal, and then input the inter-terminal voltage to the differential amplifier 262. The output of the differential amplifier 262 is converted by the analog to digital converter 122A into a digital value. The inter-terminal voltage converted into the digital value is transmitted to the IC control circuit 123, and is then held by an internal data holding circuit 125. The terminal voltages of the respective battery cells BC1-BC4 to be input to the voltage input terminals CV1-CV4 and the GND terminal are biased with electric potentials based on the terminal voltages of the battery cells connected in series to the GND potential of the cell controller IC1. The influence of the bias potential described above is removed by the differential amplifier 262 described above, and the analog value based on the terminal voltage of each of the battery cells BC1-BC4 is input to the analog to digital converter 122A.

The IC control circuit 123 has a calculation function, and at the same time has the data holding circuit 125, a timing control circuit 126 for periodically performing the voltage measurement and a state diagnosis, and a diagnostic flag holding circuit 128 in which a diagnostic flag from the diagnostic circuit 130 is set. The IC control circuit 123 decodes the content of the communication command input from the transmission input circuit 138, and then performs the process corresponding to the content. As the command, there are included, for example, a command for requesting the measurement value of the inter-terminal voltage of each of the battery cells, a command for requiring a discharge operation for adjusting the charging state of each of the battery cells, a command (Wakeup) for starting the operation of the cell controller IC, a command (sleep) for halting the operation, and a command for requiring address setting.

The diagnostic circuit 130 performs a variety of diagnoses such as an overcharge diagnosis and an over discharge diagnosis based on the measurement values from the IC control circuit 123. The data holding circuit 125 is formed of, for example, a register circuit, and stores the inter-terminal voltages of the respective battery cells BC1-BC4 thus detected so as to correspond to the respective battery cells BC1-BC4, and holds other detection values in predetermined addresses in a readable manner.

For the internal circuit of IC1, at least two types of power supply voltages VCC, VDD are used. In the example shown in FIG. 3, the voltage VCC is the total voltage of the battery cell group constituted by the battery cells BC1-BC4 connected in series to each other, and the voltage VDD is generated by a constant-voltage power supply 134. The multiplexer 120 and the transmission input circuits 138, 142 for signal transmission operate with the high voltage VCC. Further, the analog to digital converter 122A, the IC control circuit 123, the diagnostic circuit 130, and the transmission output circuits 140, 143 for the signal transmission operate with the low voltage VDD.

A signal received in a reception terminal LIN1 of the cell controller IC1 is input to the transmission input circuit 138, and a signal received in the reception terminal FFI is input to the transmission input circuit 142. The transmission input circuit 142 has substantially the same circuit configuration as the transmission input circuit 138. The transmission input circuit 138 is provided with a circuit 231 for receiving a signal from another cell controller IC adjacent thereto and a circuit 234 for receiving a signal from the photocoupler PH.

As shown in FIG. 3, in the case of the cell controller IC1, the signal from the photocoupler PH is input to the reception terminal LIN1, and in the case of the cell controller IC2, the signal from IC1 adjacent thereto is input to the reception terminal LIN1. Therefore, which one of the circuits 231, 234 is used is selected by a selector 233 based on a control signal applied to a control terminal CT shown in FIG. 3. The control signal applied to the control terminal CT is input to the control signal detection circuit 160, and then the selector 233 performs the switching operation in accordance with a command from the control signal detection circuit 160.

Specifically, in the case in which the signal from the host controller (the microcomputer 30) is input to the reception terminal LIN1 of the cell controller IC on the most upstream side in the transmission direction among the cell controller ICs, namely the cell controller IC1, a lower contact is closed in the selector 233, and then the output signal of the circuit 234 is output from the transmission input circuit 138. In contrast, in the case in which the signal from the cell controller IC adjacent thereto is input to the reception terminal LIN1 of the cell controller IC on a lower side, not the most upstream side in the transmission direction, an upper contact is closed in the selector 233, and then the output signal of the circuit 232 is output from the transmission input circuit 138. In the case of the cell controller IC2 shown in FIG. 3, since the signal from the cell controller IC1 adjacent to the cell controller IC2 is input to the transmission input circuit 138, the upper contact is closed in the selector 233. Since the peak value of the output waveform is different between the output from the host controller (the microcomputer 30) and the output from a transmission terminal LIN2 of the cell controller IC adjacent thereto, a threshold value for the determination is different. Therefore, it is arranged that the selector 233 of the circuit 138 is switched based on the control signal on the control terminal CT. It should be noted that regarding the communication system 604, substantially the same configuration is adopted.

The communication command received in the reception terminal LIN1 is input to the IC control circuit 123 through the transmission input circuit 138. The IC control circuit 123 outputs data and a command corresponding to the communication command thus received to the transmission output circuit 140. These data and command are transmitted from the transmission terminal LIN2 via the transmission output circuit 140. It should be noted that the transmission output circuit 143 also has substantially the same configuration as the transmission output circuit 140.

The signal received from the terminal FFI is used for transmitting an abnormal state (an overcharge signal). When receiving a signal representing an abnormality from the terminal FFI, the signal is input to the transmission output circuit 143 via the transmission input circuit 142 and an OR circuit 288, and is then output from the transmission output circuit 143 via the terminal FFO. Further, when detecting an abnormality in the diagnostic circuit 130, a signal representing the abnormality is input from the diagnostic flag holding circuit 128 to the transmission output circuit 143 via the OR circuit 288 irrespective of the reception content in the terminal FFI, and is then output from the transmission output circuit 143 via the terminal FFO.

When receiving the signal transmitted from the cell controller IC adjacent thereto or the photocoupler PH with the start-up circuit 147, the timer circuit 150 operates to supply the constant-voltage power supply 134 with the voltage VCC. Due to this operation, the constant-voltage power supply 134 becomes in an operative state, and outputs the constant voltage VDD. When the constant voltage VDD is output from the constant voltage power supply 134, the cell controller IC2 starts up from the sleep state to become in an operative state.

The voltage input terminals CV1-CV4 of the cell controller IC1 are terminals for measuring the cell voltages of the battery cells. The voltage detection lines SL1 through SL4 are connected respectively to the voltage input terminals CV1-CV4, and are each provided with a resistor RCV for protecting the terminal and limiting the discharge current at the capacity adjustment. The voltage detection lines SL1 through SL4 connect the voltage input terminals CV1-CV4 to positive electrodes or negative electrodes of the battery cells BC, respectively. It should be noted that the voltage detection line SL5 is connected between the negative electrode of the battery cell BC4 and the GND terminal. For example, in the case of measuring the cell voltage of the battery cell BC1, the voltage between the voltage input terminals CV1-CV2 is measured. Further, in the case of measuring the cell voltage of the battery cell BC4, the voltage between the voltage input terminal CV4 and the GND terminal is measured. Capacitors CV, Cin are disposed between the voltage detection lines as a measure against noise. Further, as described later, a part on the battery cell side of each of these voltage detection lines and a part on the cell controller IC side are connected to each other with a connector for connecting the battery module and the storage battery control device to each other.

In order to make the best use of the performance of the battery module 20 shown in FIG. 2, it is necessary to equalize the cell voltages of the totally 16 battery cells. For example, in the case in which the variation in the cell voltages is large, it is necessary to stop the regeneration operation at the moment when the battery cell having the highest voltage reaches an upper limit voltage at the regenerative charging. On this occasion, despite the cell voltages of other battery cells do not reach the upper limit, it results that the regeneration operation is stopped to waste the energy as braking. In order to prevent such a thing, each of the cell controller ICs performs discharging for adjusting the capacity of the battery cell in accordance with a command from the microcomputer 30.

As shown in FIG. 3, the cell controller ICs are provided with balancing switches BS1-BS4 for adjusting the cell capacity disposed between the terminals CV1-BR1, BR2-CV3, CV3-BR3, and BR4-GND, respectively. For example, in the case of performing the discharge of the battery cell BC1, the balancing switch BS1 is set to the ON state. Then, a balancing current flows through a path of (the positive electrode of the battery cell BC1)→(the resistor RCV)→(the terminal CV1)→(the balancing switch BS1)→(the terminal BR1)→(the resistor RB)→(the negative electrode of the battery cell BC1). It should be noted that RB or RBB is the resistor for the balancing, and BR1 through BR4 are the terminals for performing the balancing.

As described above, the balancing switches BS1-BS4 for adjusting the charging amounts of the battery cells BC1-BC4 are disposed in the cell controller IC. In the actual cell controller IC, PMOS switches are used as the balancing switches BS1, BS3, and NMOS switches are used as the balancing switches BS2, BS4.

The switching operation of each of the balancing switches BS1-BS4 is controlled by a discharge control circuit 132. Based on a command from the microcomputer 30, a command signal for setting the balancing switch corresponding to the battery cell to be discharged to a conductive state is transmitted from the IC control circuit 123 to the discharge control circuit 132. The IC control circuit 123 receives a command of the discharge time corresponding to each of the battery cells BC1-BC4 from the microcomputer 30 with communication to perform the discharge operation described above.

Between the cell controller IC1 and the cell controller IC2, there are disposed the communication systems 602, 604 as described above. The communication commands from the microcomputer 30 are input to the communication system 602 via the photocoupler PH, and is then received in the reception terminal LIN1 of the cell controller IC1 via the communication system 602. The data and the command corresponding to the communication command are transmitted from the transmission terminal LIN2 of the cell controller IC1. The reception and the transmission are performed in sequence between the cell controller ICs as described above, and the transmission signal is transmitted from the transmission terminal LIN2 of the cell controller IC2, and is then received by the reception terminal of the microcomputer 30 via the photocoupler PH. The cell controllers IC1, IC2 perform the transmission of the measurement data such as the cell voltages to the microcomputer or the balancing operation in accordance with the communication command thus received. Further, the cell controllers IC1 and IC2 each detect the cell overcharge based on the cell voltages thus measured. The detection result (the abnormal signal) is transmitted to the microcomputer 30 via the communication system 604.

As a countermeasure against ESD, each of the cell controller ICs is provided with ESD protective diodes D1, D2 corresponding to, for example, each of the voltage detection lines SL1-SL5. These diodes are disposed in the directions so that no current flows under normal conditions.

<Connection Structure Between Conventional Assembly Battery and Storage Battery Control Device>

Then, a problem in the connection structure between the assembly battery (the cell group) and the storage battery control device will be explained with reference to FIG. 4. In this drawing, there is shown only a part including the battery module 20 and the cell controllers IC1-IC4. It should be noted that in the countermeasure against ESD described above, in order to explain the connection structure of the invention and the problem at the live-line connection in the conventional connection structure, there is shown only a part of the cell controller ICs related to the explanation.

It should be noted that in the explanation presented hereinafter, the connector for connecting the battery module and the storage battery control device to each other is constituted by a battery module-side connector and a storage battery control device-side connector to be fitted into the battery module-side connector. Further, for the sake of simplicity, the photocouplers (PH) disposed in the communication channels are omitted in FIG. 4 or later.

In FIG. 4, there are shown the battery module blocks 20A and 20B. In the battery module block 20A, BC1-BC8 denote single-cell batteries (the battery cells) such as lithium single batteries, SL1-SL10 denote the voltage detection lines for detecting the terminal voltages of the respective battery cells, and CN1 denotes the connector for connecting the voltage detection lines to the storage battery control device 100. The connector CN1 is a module block connector which connects the cell controllers IC1 and IC2 controlling these cell groups each to the battery module block 20A namely cell groups 20A1 and 20A2. Regarding the battery module block 20B, substantially the same configuration is adopted. The connector CN2 is a module block connector which connects the cell controllers IC3 and IC4 controlling these cell groups each to the battery module block 20B namely cell groups 20B1 and 20B2.

As shown in FIG. 4, in an area RC-Net surrounded by the dotted line, there is disposed a wiring circuit including the voltage detection lines SL1 through SL20, the protective circuit, and the discharge circuit. The protective circuit and the discharge circuit are constituted by the capacitors denoted with the symbols CV and Cin, and the resistors denoted with the symbols RCV and RB. In the area RC-Net, there are further included cell controller outside wiring lines on the high potential side (the VCC side) and the low potential side (the GND side) of each of the cell controllers IC1-IC4, and it is performed that a capacitor and so on (not shown) as the countermeasure against noise are further attached between the VCC side and the GND side.

The VCC side wiring line of each of the cell controller ICs in the area RC-Net is connected to the voltage detection line having the highest potential of the cell group connected to the cell controller IC, and the GND side wiring line is connected to the voltage detection line having the lowest potential of the cell group. For example, the VCC side wiring line of the cell controller IC1 is connected to the voltage detection line SL1, and the GND side wiring line is connected to the voltage detection line SL5. Further, a VCC side terminal VCCT of each of the cell controller ICs and the voltage detection line having the highest potential are connected to each other at a positive electrode side external terminal of the cell controller IC, and a GND side terminal GNDT is connected to the voltage detection line having the lowest potential at a negative electrode side external terminal.

SD-SW denotes a switch (service disconnect) for breaking a main circuit of the battery at maintenance and so on. The switch SD-SW incorporates a fuse for breaking the circuit when an abnormal current flows through the battery.

It should be noted that in the case of connecting the battery module 20 to the storage battery control device 100 via the connector CN1 or the connector CN2, the case of performing the maintenance of the electrical storage device 11, and so on, the switch SD-SW is pulled out for the sake of safely to thereby break the connection between the battery module blocks 20A and 20B.

The cell controllers IC1-IC4 are each an integrated circuit provided with a function of measuring the battery voltage. These cell controller ICs each incorporate a power supply terminal and a GND terminal denoted with VCC, GND, the ESD (electrostatic discharge) protective diodes such as D1, D2, and so on. As described above, the one-bit communication system 604 is the communication channel for transmitting the abnormal signal when the cell overcharge is detected. C1-C4 denote the countermeasure against noise described above, and denote bypass capacitors for stabilizing the voltage of the respective cell controller ICs. EP1 through EP3 denote electronic components (current limiting elements) formed of resistors, capacitors, and so on for limiting the current and disposed on the communication channel 604 between the cell controller ICs. By providing a configuration having not only a resistor but also a capacitor connected in parallel thereto to the current limiting element, the current limiting element having a desired time constant according to needs can be obtained.

In the connection structure shown in FIG. 4 for connecting the assembly battery and the storage battery control device to each other, there is the following problem. In the case, for example, the battery having been charged and the storage battery control device 100 are connected with the live-line connection, since the sequence of connecting the terminals cannot be controlled in a general connector, there is a possibility of damaging the cell controllers IC1, IC2 in the storage battery control device 100 depending on the sequence of connecting the voltage detection lines.

The mechanism that an overcurrent flows through the cell controller IC will be explained.

It should be noted that since the operation for connecting the battery module blocks 20A and 20B to the respective cell controller ICs is the same between the battery module blocks 20A and 20B, the battery module block 20A will hereinafter be explained as a representative example. Since the switch SD-SW is connected after the battery module blocks 20A and 20B are respectively connected to the cell controller ICs, the problem caused by a rush current at the live-line connection in either one of the battery module blocks will be explained.

Figure 5:
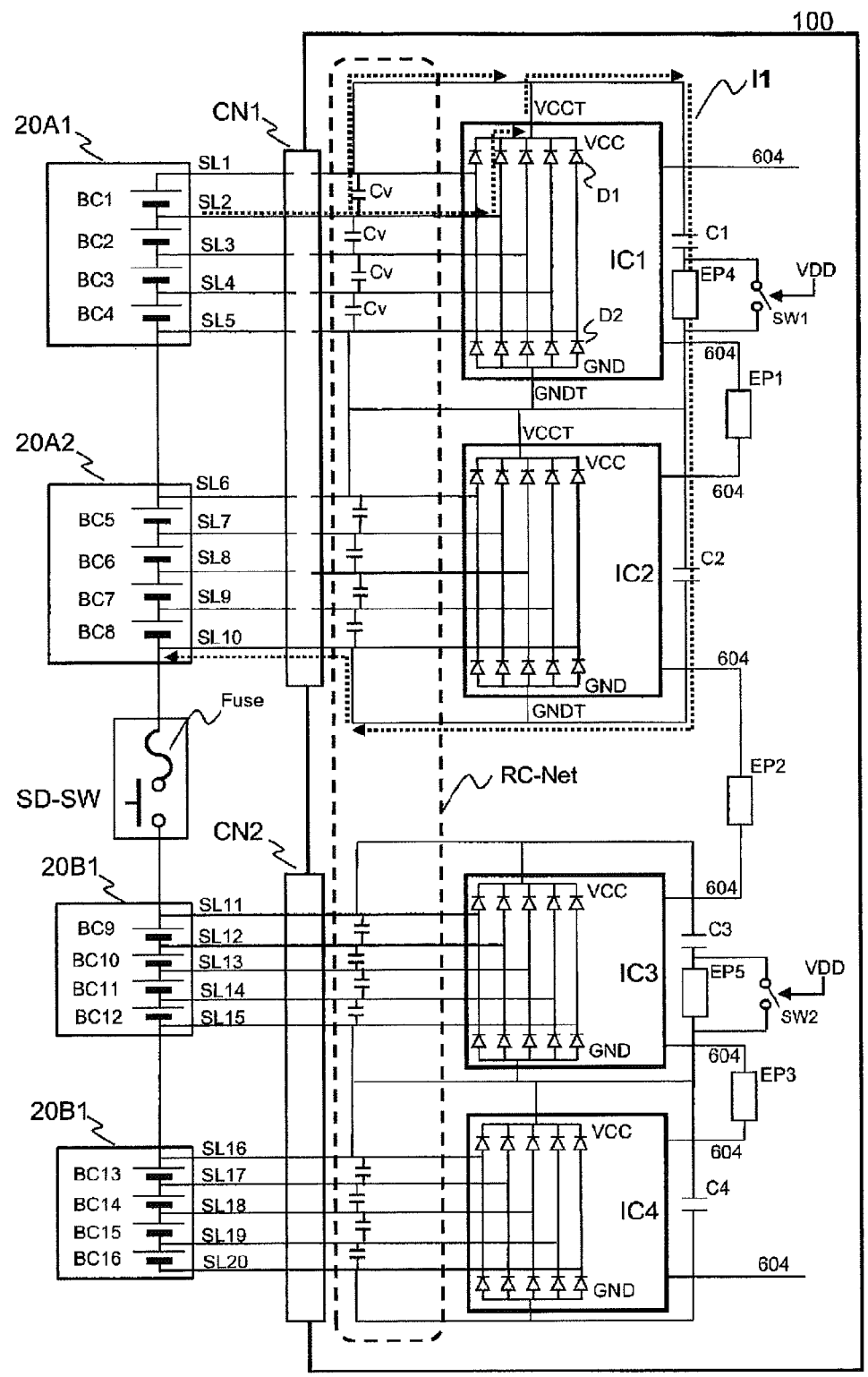
FIG. 5 is a diagram showing a first embodiment of a storage battery control device according to the invention, and shows a configuration of disposing a current-limiting element and a shorting switch therefor in a current path between two cell controller ICs.
Figure 6:
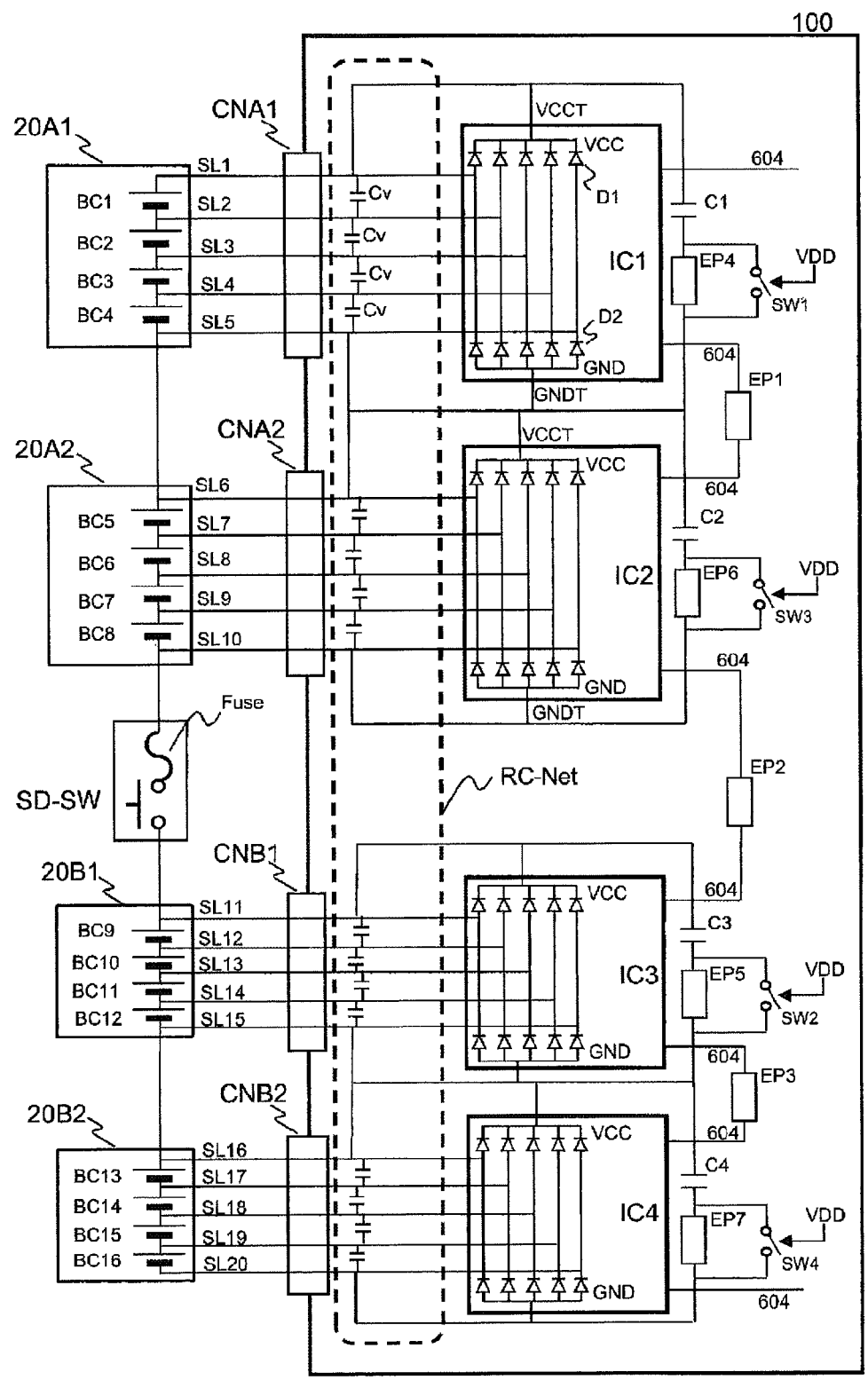
FIG. 6 is a diagram showing a second embodiment of the storage battery control device according to the invention, and shows a configuration of providing a current-limiting element and a shorting switch therefor to all cell controller ICs.
Figure 7:
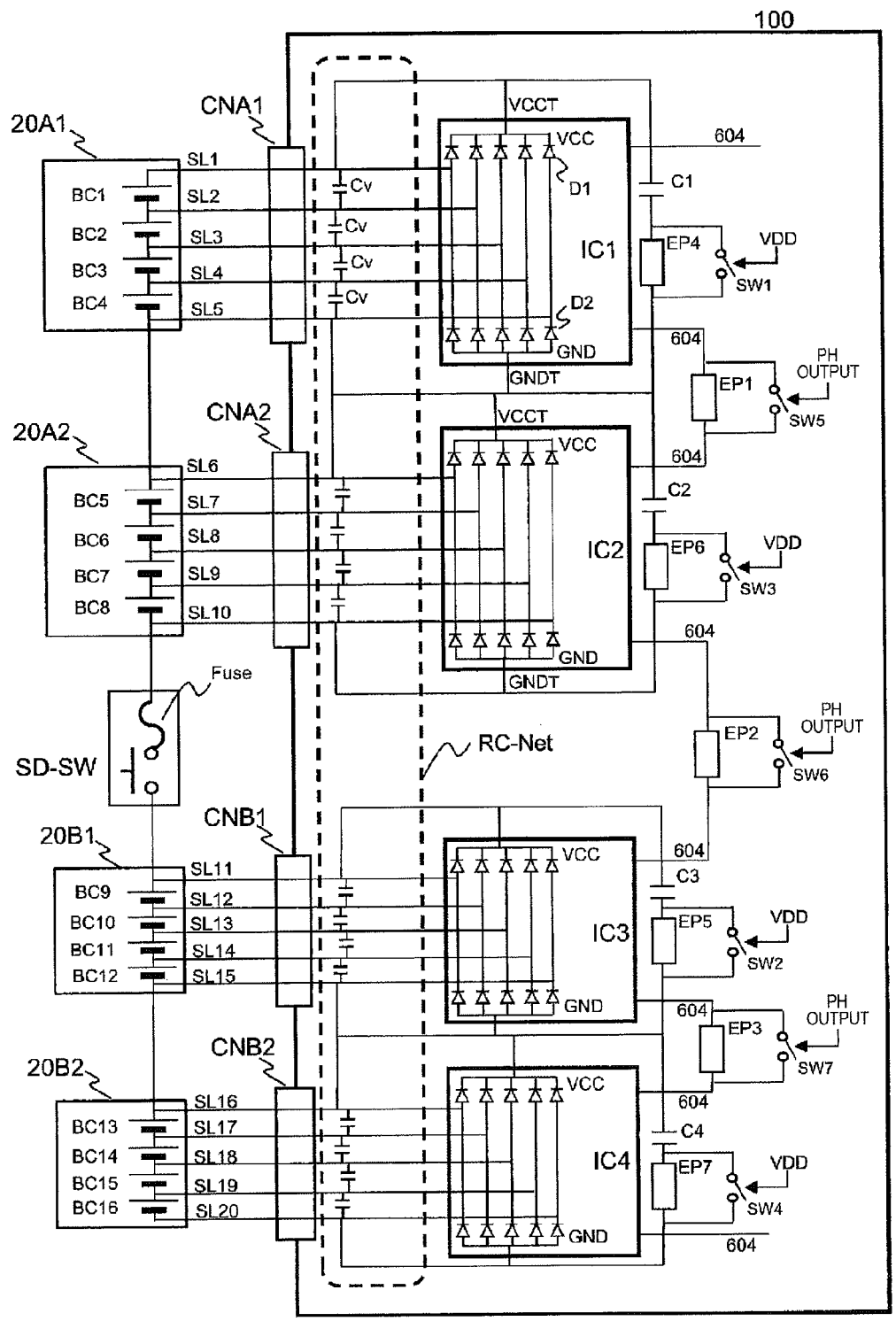
FIG. 7 is a diagram showing a third embodiment of the storage battery control device according to the invention, and shows a configuration of providing a current-limiting element and a shorting switch therefor to all cell controller ICs.

It should be noted that in FIGS. 5-7, the battery module block 20B side is described with some reference symbols omitted.

As an example, there is assumed the case in which the voltage detection lines SL2 and SL10 are connected first, and other voltage detection lines remain unconnected. In this case, as indicated by the heavy dotted lines with arrows in FIG. 4, a charging current I1 of the bypass capacitors C1, C2 flows from the voltage detection line SL2 to the voltage detection line SL10 via the ESD diode D1 incorporated in the cell controller IC1 and the bypass capacitors C1, C2. It is necessary to prevent the charging current I1 from exceeding an allowable current for the diode D1 incorporated in the cell controller IC1. Although it is effective for suppressing the current flowing through the diode D1 to increase the capacitance value of the capacitor CV to make the current flow through the capacitance CV side to thereby suppress the current of the diode D1 in the cell controller IC1, there is a problem that the area RC-Net including the capacitor CV incurs rise in cost.

Further, the charging current I1 depends on the capacitance values of the bypass capacitors C1, C2 and the voltage difference between the voltage detection lines SL2 and SL10. The capacitance values of the bypass capacitors C1, C2 tend to increase in the system equipped with an inverter such as a hybrid vehicle or an electric vehicle for the purpose of improving the noise immunity of the inverter. Further, the voltage difference between the voltage detection lines depends on the number of cell controller ICs connected thereto increasing in accordance with the number of the batteries connected in series to each other. Therefore, the larger the number of the batteries connected in series to each other becomes, the larger the voltage difference becomes.

It should be noted that in FIG. 3 explained above, the bypass capacitor C1 is omitted.

Although there is adopted the configuration of connecting each of the voltage detection lines SL5, SL6 and SL15, SL16 to the storage battery control device 100 in FIG. 4, since the voltage detection lines SL5 and SL6 are connected to each other inside the storage battery control device 100, either one of them is left unconnected in some cases. Similarly, either one of the voltage detection lines SL15 and SL16 is left unconnected in some cases.

According to the above, in the case of connecting the storage battery control device 100 equipped with the cell controllers IC1-IC4 to the battery module 20, namely the cell groups 20A1, 20A2, 20B1, and 20B2 with the live-line connection, a countermeasure for suppressing the overcurrent in these cell controller ICs becomes necessary.

<Connection Structure Between Assembly Battery and Storage Battery Control Device According to the Invention>

In the invention, in order to solve the problem described above, the current limiting element is inserted in the current channel through which the overcurrent might flow in the ESD diode incorporated in a first cell controller IC1 in the control device, and at the same time a circuit for shorting the current limiting element during the operation is attached to thereby achieve the part protection at the live-line connection and the normal operation after starting up. The current channel is identified using a simulation, a calculation, and the orientation of the ESD diode. As shown in FIG. 4, it is configured that the ESD diodes (D1, D2) are disposed so that almost the entire charging current at the live-line connection flows in the VCC side of each of the cell controller ICs, and further flows in the GND side of the cell controller IC2 passing through the bypass capacitors C1, C2 in the outside of the cell controllers IC1, IC2. Therefore, it is arranged that the current limiting element and the circuit for shorting the current limiting element are added to the channel of the charging current.

Further, in the invention, it can be realized using a general connector without using the special connector for defining the sequence of the live-line connection explained firstly. Hereinafter, the details of the embodiment will be explained.

First Embodiment

FIG. 5 is an example showing a first embodiment of the invention. Hereinafter, the same components as those in FIG. 4 are denoted with the same reference numerals, and the explanation thereof will be omitted.

In the present embodiment, compared to the comparative example shown in FIG. 4, in the current channel through which the overcurrent might flow in the ESD diode incorporated in the cell controller IC1 explained above, namely the circuit (the circuit through which the charging current I1 flows) connecting the VCC side of the cell controller IC1 and the GND side of IC2 to each other, a current limiting element EP4 and a switch SW1 for shorting the current limiting element are connected between the cell controllers IC1 and IC2.

The switch SW1 is in the OFF state, namely opened, in the case in which the cell controller IC1 is not the ON state, namely not started up, and the charging current described above is arranged to flow through the current limiting element EP4. As such a switch SW1, a semiconductor relay, for example, is used. The semiconductor relay operates while being supplied with the power VDD from the cell controller IC1. Specifically, there is provided the semiconductor relay in which the switch SW1 is closed after a predetermined delay time elapses from when the cell controller IC1 is started up to thereby make the charging current bypass the current limiting element EP4.

As described above, the cell controllers IC1-IC4 are started up in response to the start-up circuit 147 receiving the signal transmitted from the host controller via the adjacent cell controller IC or the photocoupler PH. Since the power VDD is supplied after the cell controller IC has been started up, the switch SW1 is set to the ON state after the battery module 20 and the storage battery control device 100 are connected to each other with the connectors CN1 and CN4.

It should be noted that as shown in FIG. 5, if the current channel, through which the overcurrent might flow in the ESD diode in the cell controller IC3, also exists in the cell controllers IC3 and IC4, a current limiting element EP5 and a switch SW2 for shorting the current limiting element are similarly connected also between the cell controllers IC3 and IC4.

By adopting such a configuration, the overcurrent to the cell controller IC, which is at issue in the comparative example (FIG. 4), can be prevented. In the case in which, for example, the voltage detection lines SL2 and SL10 are first connected to the storage battery control device 100, the charging current I1 of the bypass capacitor C1 is urged to flow in the channel indicated by the dotted arrow lines in the drawing, namely from the signal line SL2 through the diode D1 and the capacitor C1. However, as described above, the charging current I1 is limited by the current limiting element EP4. In other words, the overcurrent does not flow in the ESD diode. Therefore, even in the case in which the voltage detection lines SL2 and SL10 are connected first, the cell controller IC1 can be protected.

In the connection structure shown in FIG. 5, although the highest charging current I1 flows in the capacitor C1 through the diode D1 in the case in which the voltage detection lines SL2 and SL5 are connected, since the charging current I1 also flows through the capacitor C1 via other ESD diodes such as D2 or D3, substantially the same advantage as described above can be obtained with respect to other ESD diodes.

Further, even in the case in which the number of secondary batteries in the cell group increases, and the capacitance of the capacitor C1 increases accordingly, it is possible to set the resistance value of the current limiting element EP4 to a sufficiently large value to thereby achieve the limitation so that a current higher than the allowable value does not flow in the ESD diode.

However, if it is arranged that such a current limiting diode EP4 as described above is always connected in series to the channel through which the charging current I1 flows, there is a possibility that the advantage of the bypass capacitor C1 for stabilizing the voltage of the cell controller IC1 fails to be obtained. As is explained above, by using the bypass circuit provided with the switch SW1 for shorting the current limiting element EP4, and shorting the current limiting element EP4 during the normal operation except the operation at the live-line connection, the possibility of hindering the advantage of the bypass capacitor is eliminated.

The highest current of the charging current I1 flowing through the capacitor C1 explained above flows due to the charging current caused when connecting (with the live-line connection) the battery module 20A or 20B and the storage battery control device 100 to each other with the connector CN1 or CN2. In the normal operation after the connection, there is no chance that such a high current as in the live-line connection flows. Therefore, by adopting such a configuration of the current limiting element EP4 and the shorting switch SW1 as described above, it is possible to achieve both of the charging current treatment in the live-line connection between the battery module 20 and the storage battery control device 100, and the advantage of the bypass capacitor for the cell controller IC during the normal operation of the storage battery control device 100.

It should be noted that in FIG. 5 (and FIGS. 6 and 7 referred to below), the current limiting element EP4 is connected between the bypass capacitor C1 and the lower potential side (GND) of the cell controller IC1 on the grounds that the drive of the switch SW1 for shorting the current limiting element EP4 is performed with the power VDD supplied from the cell controller IC1.

Further, in FIG. 5, the current limiting element EP4 and the shorting switch SW1 are disposed on the cell controller IC1 side among the two cell controllers IC1 and IC2 adjacent to each other. In the case of disposing the current limiting element and the shorting switch in either one of the two cell controller ICs adjacent to each other, these elements are disposed in the cell controller IC1 on the high potential side since the current becomes high in the case in which the rush current occurs on the high potential side.

Further, although FIG. 5 is described as if each of the battery modules is formed of the two cell groups in order to simplify the explanation, each of the battery modules can also be formed of two or more cell groups. In such a case, in the case in which just one set of current limiting element and shorting switch is disposed, the set is disposed in the cell controller IC having the highest potential.

Second Embodiment

FIG. 6 is an example showing a second embodiment of the invention. Hereinafter, the same components as those in FIGS. 4 and 5 are denoted with the same reference numerals, and the explanation thereof will be omitted.

In the present embodiment, the circuit composed of the current limiting element (EP4, EP6, EP5, EP7) and the switch (SW1, SW3, SW2, SW4) for shorting the current limiting element is connected in series to each of the bypass capacitors of all of the cell controller ICs. As explained above, each of the shorting switches is set to the ON state by the power (VDD) supplied from the cell controller IC and each of the current limiting elements is bypassed (shorted) during the normal operation of the storage battery control device 100.

In order to simplify the explanation and the graphical description, FIG. 6 shows an example of constituting each of the cell groups (20A1, 20A2, 20B1, 20B2) by four secondary battery cells. In recent years, to cope with the increase in demand for high-power electrical storage device constituted by a plurality of lithium single batteries or the like, and the demand for price reduction, the number of secondary battery cells per cell group tends to increase.

Therefore, the VCC voltage in each of the cell groups also tends to rise, and by providing not only the bypass capacitors but also the current limiting elements and the shorting switches described above to each of the cell controller ICs, the internal circuit including the ESD diode of each of the cell controller ICs can be protected.

It should be noted that in FIG. 6, the cell groups (20A1, 20A2, 20B1, and 20B2) and the cell controllers IC1-IC4 for monitoring/controlling the state of the secondary battery cells in these cell groups are connected to each other with respective connectors CNA1, CNA2, CNB1, and CNB2 independent of each other. As shown in FIG. 5, the connection can also be achieved using the connectors CN1, CN2 corresponding respectively to the battery module blocks (20A, 20B).

In the configuration example of the invention described above, as the power source for setting the switch SW1 to the ON state, VDD of the cell controller IC1 is used. VDD of the cell controller IC1 is output in the case in which the cell controller IC1 is in operation. Therefore, at the live-line connection, the protection of the cell controller IC by the current limiting element EP4 becomes possible. Further, in the case in which the balancing resistor RB having a low resistance value shown in FIG. 3 exists in the current channel, it is necessary to use a high-power resistor high in durability, namely having heat resistance, as the balancing resistor RB. However, as described above, since in the invention, there is no chance for the high rush current to flow, by using a general resistor as the balancing resistor without using the special element, the cost of the storage battery control device 100 can be suppressed. Further, it becomes possible to realize the connection between the assembly battery and the storage battery control device at a moderate price using a connecter available for general use without using the special connector for defining the sequence of the live-line connection.

Third Embodiment

FIG. 7 is an example showing a third embodiment of the invention. Hereinafter, the same components as those in FIGS. 4 through 6 are denoted with the same reference numerals, and the explanation thereof will be omitted.

In the present embodiment, there is provided a configuration in which the switch (SW5, SW6, SW7) for shorting (bypassing) the current limiting element (EP1, EP2, EP3) disposed in the communication system 604 between the two cell controller ICs adjacent to each other connected in series to each other via the communication system 604 is also disposed in parallel to the current limiting element (EP1, EP2, EP3).

Although the current limiting elements (EP1, EP2, EP3) of the communication system 604 are also disposed as the countermeasure against ESD between the cell controller ICs, since there is a possibility that the rush current explained above flows via the communication system 604, the protection of the circuit in the cell controller IC due to this action can be achieved.

However, there is a possibility that the current limiting element deteriorates the quality of the signal transmitted and received in the communication system 604. Therefore, in the state in which the storage battery control device including the cell controller IC has been started up, and it is unnecessary to protect the cell controller IC due to the rush current and so on, by setting the switches SW5-SW7 to the ON state to bypass the current limiting elements (EP1, EP2, EP3) of the communication system 604, the signal quality deterioration of the communication system can be avoided.

It should be noted that since the switches (SW5, SW6, SW7) disposed in parallel to the respective current limiting elements (EP1, EP2, EP3) disposed in the communication system 604 affect not only the communication between the two cell controller ICs but also the quality of the communication signals of all of the cell controller ICs connected to the communication channel 604 and the communication signals between these cell controller ICs and the host controller (the microcomputer 30), it is desirable that the control of these switches is performed by the host controller.

Therefore, it is preferable that isolation elements such as the photocouplers (PH) shown in FIG. 2 are further disposed (not shown) for controlling the switches SW5-SW7, and each of the switches is controlled by the host controller via these photocouplers. It is sufficient to control the switches SW5-SW7 using, for example, the output voltages of the respective photocouplers.

Fourth Embodiment

Figure 8:
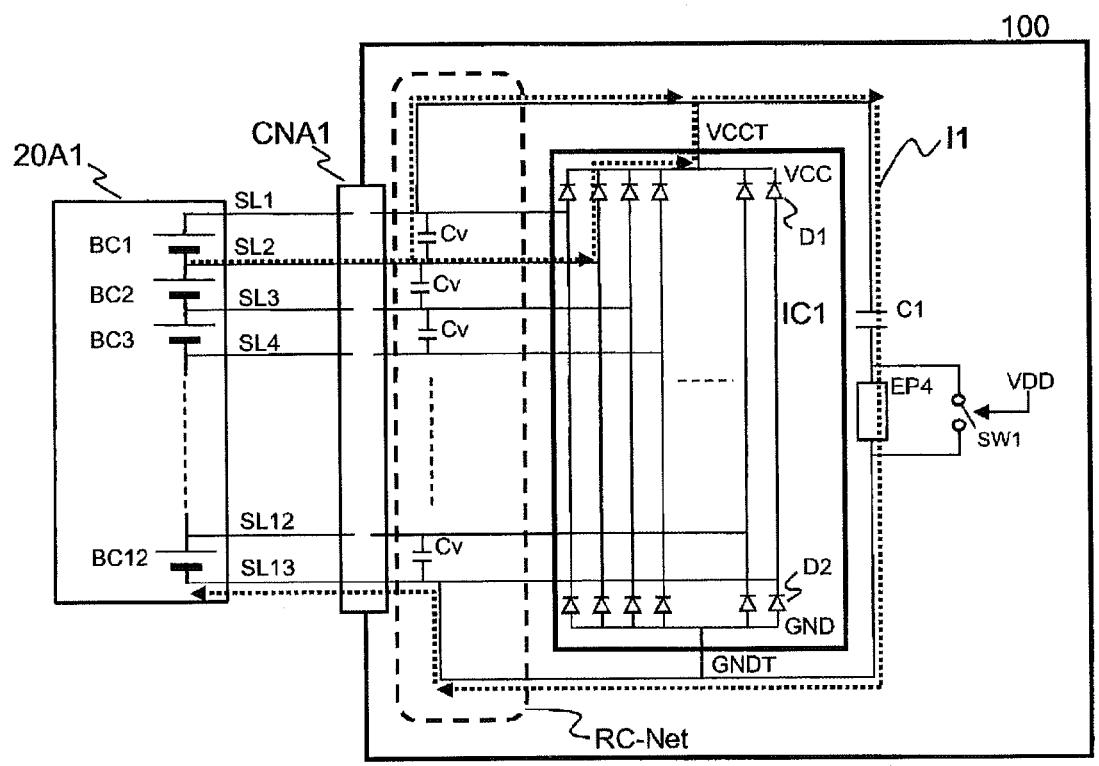
FIG. 8 is a diagram showing a fourth embodiment of the storage battery control device according to the invention, and shows an example of an electrical storage device having a configuration formed of one cell group and one cell controller IC.

As described above, the number of secondary battery cells constituting one cell group tens to increase in recent years. FIG. 8 is an example in the case in which one cell group has, for example, a configuration of connecting twelve lithium ion secondary battery cells in series to each other.

FIG. 8 shows a configuration of a set of one cell group and the cell controller IC for controlling the cell group extracted from FIG. 6 or FIG. 7. Here, assuming the correspondence to, for example, the cell group 20A1 having the highest potential in FIG. 6 or FIG. 7 and the cell controller IC1, the common reference numerals are used. It should be noted that in accordance with the fact that the number of secondary battery cells is twelve, the voltage detection lines are denoted as SL1 through SL13, and circuits each including the ESD diodes (D1, D2) in the RC-Net and the cell controller IC are disposed in accordance with the number of the secondary battery cells. It should be noted that the wiring lines including the communication system between the cell controller ICs are omitted.

It should be noted that in the case of an application other than electric vehicle such as HEV or EV, and in the case in which the output of about several tens of volts is sufficient, it is possible to use the electrical storage device having the configuration including one cell group and one cell controller IC as shown in FIG. 8.

In the configuration shown in FIG. 8, one cell group is formed of twelve lithium ion secondary battery cells, and the terminal voltage thereof is set to be higher than twice of that of the cell group formed of four secondary battery cells shown in FIGS. 4 through 7.

In such a case, even with a single cell group shown in FIG. 8, it is necessary to take the protective measure for the ESD diode due to the charging current I1 with the live-line connection when connecting the connectors of the cell group 20A1 and the cell controller IC1 similarly to the explanation described above.

In the example shown in FIG. 8, there is assumed the case in which the voltage detection lines SL2 and SL13 are connected first, and other voltage detection lines remain unconnected. In this case, the charging current I1 of the bypass capacitor C1 flows from the voltage detection line SL2 to the voltage detection line SL13 via the ESD diode D1 incorporated in the cell controller IC1, the bypass capacitor C1, and the current limiting element EP4. If the charging current I1 exceeds the allowable current for the diode D1 incorporated in the cell controller IC1, the cell controller IC1 is damaged. However, since the current limiting element EP4 is provided, the current flowing through the diode D1 is limited, and thus, the damage of the diode D1 can be avoided.

In the configuration example shown in FIG. 8, the switch SW1 for shorting (bypassing) the current limiting element EP4 is also disposed in parallel to EP4, and the switch SW1 is set to the ON state by VDD of the cell controller IC1. Alternatively, as described above, it is also possible to arrange that the switch SW1 is controlled with, for example, the output voltage of the photocoupler PH (not shown), and the photocoupler PH is controlled by a host battery controller.

It should be noted that it is also possible to connect a plurality of cell groups and cell controller ICs having the configuration shown in FIG. 8 in series or in series-parallel to each other to thereby be used as a high-voltage high-power electrical storage device. In this case, as explained above in the description of the first through third embodiments (FIGS. 5-7), there is adopted the configuration of disposing the current limiting resistor and the bypass switch in the wiring line between the cell controller ICs. In other words, there is adopted the configuration obtained by increasing the number of secondary batteries in each of the cell groups in FIG. 6 or FIG. 7.

Modified Example 1

Although in the configuration example of the invention described above, VDD of the cell controller IC1 is used as the electric power for driving the shorting switches SW1 through SW4, it is also possible to use, for example, the output voltage (the power supply on the cell controller IC side) of the photocoupler (PH) and control the switches for shorting the current limiting elements by the host controller (the microcomputer 30) without using VDD as explained in the description of the third and fourth embodiments (FIGS. 7 and 8).

Modified Example 2

Figure 9:
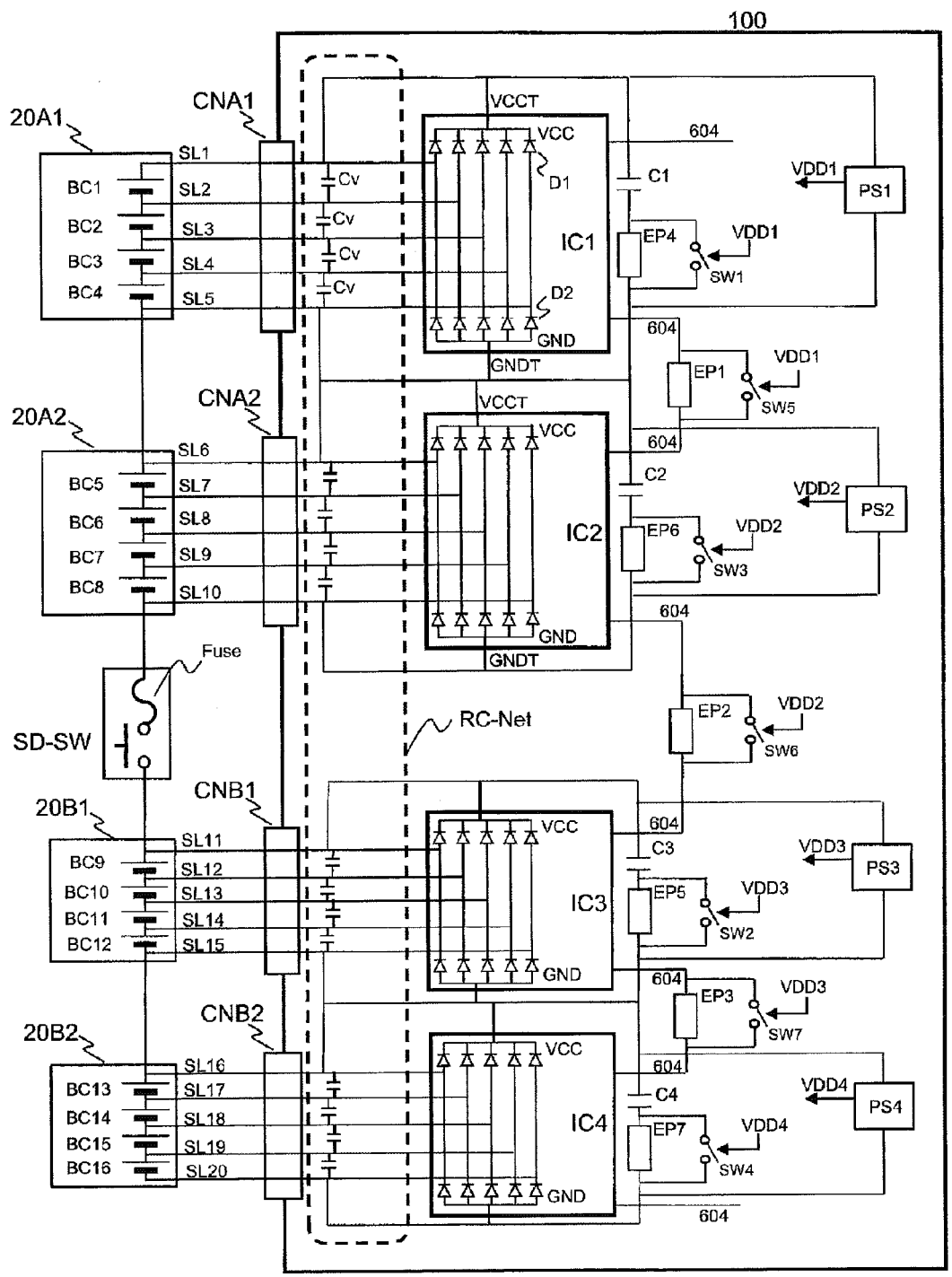
FIG. 9 is a diagram showing a modified example of the storage battery control device according to the invention, and shows a configuration provided with a power supply circuit for driving a switch for shorting the current-limiting element.

Further, as shown in FIG. 9, it is also possible to provide power supply circuits PS1-PS4 for driving the switches SW1-SW7 for respectively shorting the current limiting elements EP1-EP7. These power supply circuits PS1-PS4 are supplied with the VCC power respectively from the cell controller IC1-IC4, and supply the drive power VDD1-VDD4 for the switches SW1-SW7. Therefore, in the case in which a sufficient time can be made after the live-line connection until the cell controller IC is started up, it is also possible to set the shorting switches SW1-SW7 in advance at the time point when the charging current of the bypass capacitor vanishes. By adopting this process, it becomes possible to perform the communication between these cell controller ICs promptly with high quality once the cell controller ICs are started up.

Other Modified Examples

The embodiments described hereinabove can also be put into practice with the following modifications.

(1) Although in the connection configuration shown in FIG. 5, there is shown the example in which one cell controller IC (e.g., IC1) is in charge of the voltage detection of four battery cells, the invention can also be applied to the case of an example in which one cell controller IC is in charge of six or twelve battery cells.

(2) The number of the battery cells of which the cell controller IC is in charge is different between the cell controller ICs in some cases depending on the number of the battery cells connected in series to each other such as the case in which the first cell controller IC is in charge of five battery cells while the second cell controller IC is in charge of six battery cells. However, the invention can also be applied to such a configuration.

(3) The ESD diode D1 incorporated in the cell controller IC is illustrative only, and the configuration of the ESD diode is subject to change depending on the configuration of the cell controller IC. An important point here is the fact that according to the invention, a transient current flowing through the element in the cell controller IC at the live-line connection can be suppressed to a low level.

(4) Although in Modified Example 1 described above, it is explained that the shorting switches SW1-SW7 for the current limiting elements are each controlled with the output voltage of the photocoupler, it is also possible to use, for example, a digital isolator using the isolation element other than the photocoupler such as a transformer, and control the shorting switches SW1-SW7 using the output voltage thereof. The control of these switches is not required to be high-speed, and other devices than the photocoupler or the digital isolator can also be adopted. For example, it is also possible to achieve the isolation between the cell controller IC on the high voltage side and the cell controller IC on the low voltage side using a capacitor, operate a circuit such as a flip-flop disposed on the cell controller IC side based on a signal transmitted to the cell controller IC side from the host controller IC (a battery controller) via the capacitor, and then control each of the shorting switches SW1-SW7 with the output of the flip-flop circuit.

(5) Although in the connection configuration shown in FIG. 5, there is shown the example in which the sixteen battery cells are separated into upper eight battery cells and lower eight battery cells, and the switch SD-SW is disposed in between, the installation position of the switch SD-SW, the number of battery cells connected in series-parallel to each other, and so on can flexibly be changed. For example, although in FIG. 5, the switch SD-SW is installed between the cell groups 20A2 and 20B1, it can also be installed between the cell groups 20A1 and 20A2, or between the cell groups 20B1 and 20B2. Further, in the case in which a plurality of battery modules 20, or a plurality of battery module blocks 20A, 20B is connected in series or in series-parallel to each other, it is sufficient to install the switch SD-SW at either of the places between the battery modules or the battery module blocks connected in series to each other.

(6) Although the current limiting element and the shorting switch for the current limiting element are disposed to the cell controller IC on the high potential side among the two cell controller ICs adjacent to each other in the connection configuration shown in FIG. 5, and the current limiting elements are disposed to all of the cell controller ICs in the connection configuration shown in FIG. 6, it is possible for the current limiting element and the shorting switch to be disposed based on the potential of the cell controller IC. Specifically, in the case in which the plurality of cell controller ICs is connected to the battery module block constituted by the plurality of cell groups, it is also possible to arrange that the current limiting elements and the shorting switches are disposed to a plurality of cell controller ICs on the high potential side.

According to the first through fourth embodiments (FIGS. 5-8) described above, the following functions and advantages can be obtained.

(1) Since in the live-line connection in the storage battery control device provided with the voltage detection lines of the battery cells and the voltage detection function of the battery cells, the sequence of the connection is not at all considered, there is an advantage that the assembly of the assembly battery is made easier.

(2) When replacing only the storage battery control device in the customer's site, there is an advantage that the storage battery control device can easily be replaced without considering the connection sequence between the battery module and the storage battery control device.

(3) Since the circuit components in the area inside the live-line connection free storage battery control device, the RC-Net section, and so on can be formed of those having a small capacitance value, resistors compliant with low electric power, and so on, there is an advantage that the RC-Net section can be realized at low cost, and at the same time, the reduction in cost of the storage battery control device can be achieved.

As explained hereinabove, the storage battery control device according to the invention is connected to the assembly battery having a plurality of secondary battery cells connected to each other, and is provided with a plurality of cell controller ICs for monitoring/controlling the charging/discharging state of each of the secondary battery cells.

The plurality of cell controllers ICs is each provided with the protective bypass capacitor if necessary. When connecting the assembly battery and the storage battery control device with the connector, since a fluctuation occurs in the connection (the live-line connection) sequence of the pins in the connector, a high voltage is rapidly applied to the cell controller IC depending on circumstances.

The protective bypass capacitor is disposed with the aim of the protection of the cell controller IC against such a voltage. If the charging current of the bypass capacitor is high, a high current also flows in the internal circuit such as the diode for the ESD protection disposed inside the cell controller IC. Although the balancing discharge is appropriately performed in order to adjust the charging state of each of the secondary battery cells, a resistor small in resistance is apt to be used as the balancing resistor in order to perform the balancing discharge in a short period of time, and therefore, there is a possibility that the charging current is also increased.

It should be noted that the embodiments and the modified examples described above can be used alone or in combination. This is because the advantages in the respective embodiments and modified examples can be obtained alone or in a synergistic manner. Further, the invention is not limited to the embodiments and the modified examples described above unless the feature of the invention is diminished.

The invention claimed is:

1. A storage battery control device adapted to control an assembly battery having a plurality of secondary battery cells connected to each other, comprising:
    at least one integrated circuit electrically connected to the assembly battery detachably via a connector, having a power supply to supply internal power using a voltage of the assembly battery, and to monitor and control charging and discharging of each of the secondary battery cells of the assembly battery;
    a bypass capacitor disposed in a channel connecting a positive electrode-side external terminal and a negative electrode-side external terminal of the integrated circuit to each other;
    at least one first current limiting element disposed in the channel and to limit a charging current of the bypass capacitor flowing through the channel when electrically connecting the assembly battery and the integrated circuit to each other; and
    at least one first switch disposed in parallel to the first current limiting element, and for setting to an ON state due to supply of the internal power from the power supply to short the first current limiting element,
    wherein the first switch for setting to the OFF state to allow the charging current to flow through the first current limiting element in a case in which the integrated circuit is not started, and the internal power is not supplied from the power supply when the assembly battery and the integrated circuit are electrically connected to each other, and
    the first switch for setting to the ON state to short the first current limiting element when the internal power is supplied from the power supply after the assembly battery and the integrated circuit are electrically connected to each other to start up the integrated circuit.

2. The storage battery control device according to claim 1, wherein
    a plurality of the integrated circuits, a plurality of the first current limiting elements, and a plurality of the first switches are included,
    the plurality of the first current limiting elements is each disposed in all of the channels of the plurality of integrated circuits, or in a channel through which a rush current higher than an allowable current flows when the assembly battery and the integrated circuit are electrically connected to each other among the channels of the plurality of integrated circuits, and
    the first switches are disposed corresponding respectively to the first current limiting elements.

3. The storage battery control device according to claim 1, wherein
    the first switch is closed with a delay to short the first current limiting element after the integrated circuit is started.

4. The storage battery control device according to claim 2, further comprising:
    a communication channel to communicate a variety of signals between two of the integrated circuits disposed consecutively;
    a second current limiting element to limit the current flowing through the communication channel; and
    a second switch disposed in parallel to the second current limiting element, and to short the second current limiting element.

5. The storage battery control device according to claim 4, further comprising:
    an isolation element used to control the second switch, wherein the second switch is closed via the isolation element used to control the second switch in response to a signal from a host controller of the integrated circuit to short the second current limiting element.

6. The storage battery control device according to claim 4, further comprising:
a shorting switch driving power supply disposed separately from the integrated circuit,
wherein the second switch is closed by an output of the shorting switch driving power supply to short the second current limiting element after the integrated circuit is started.

7. The storage battery control device according to claim 2, wherein
the first current limiting element and the first switch are disposed with respect to a channel connecting a positive electrode-side external terminal and a negative electrode-side external terminal of at least the integrated circuit with the highest potential and to control a predetermined number of the secondary batteries among the plurality of integrated circuits.

8. An electrical storage device comprising:
the storage battery control device according to claim 1; and
the assembly battery.

9. The storage battery control device according to claim 2, wherein
the first switch is closed with a delay to short the first current limiting element after the integrated circuit is started.

* * * * *